United States Patent [19]

Lowe

[11] Patent Number: 4,677,906
[45] Date of Patent: Jul. 7, 1987

[54] PAN INSERT

[76] Inventor: Virginia L. Lowe, 500 E. Silver Star Rd., Ocoee, Fla. 32761

[21] Appl. No.: 826,605

[22] Filed: Feb. 6, 1986

[51] Int. Cl.⁴ .................. A47J 37/00; A47J 43/18
[52] U.S. Cl. ...................................... 99/450; 99/426; 99/449; 99/425; 206/804; 210/514; 220/409; 294/32; 426/523; 426/478
[58] Field of Search ............... 294/32, 7, 1.1; D7/102, D7/104, 359, 103, 354, 409; 99/426, 450, 449, 425; 210/514; 220/93, 409; 229/315 MF; 206/804; 426/523

[56] References Cited

U.S. PATENT DOCUMENTS

| D. 183,005 | 6/1958 | Krause | D7/409 |
|---|---|---|---|
| D. 231,765 | 6/1974 | Kean | D7/103 |
| 850,582 | 4/1907 | Horton | 294/7 |
| 1,130,234 | 3/1915 | Wrobel | 294/7 |
| 1,256,245 | 2/1918 | Milliorn | 294/32 |
| 1,263,863 | 4/1918 | Crosby | 99/449 |
| 1,550,138 | 8/1925 | Baker | 99/426 |
| 1,630,471 | 5/1927 | Collins | 99/450 |
| 1,718,624 | 6/1929 | Baker | 99/450 |
| 1,746,614 | 2/1930 | Sibbald | 294/7 |
| 1,781,635 | 11/1930 | Fischacher | 294/32 |
| 2,026,078 | 12/1935 | Walker | 294/32 |
| 2,135,782 | 11/1938 | McBirney | 99/450 |
| 2,272,314 | 2/1942 | Williams | D7/103 |
| 2,297,332 | 9/1942 | Stewart | D7/103 |
| 2,337,142 | 12/1943 | Williams | 294/1.1 |
| 2,450,716 | 10/1948 | Chittick | 294/1.1 |
| 2,514,098 | 7/1950 | Shreiner | 294/1.1 |
| 2,544,846 | 3/1951 | Mach | 99/450 |
| 2,565,046 | 8/1951 | Rooth | 99/450 |
| 2,703,046 | 3/1955 | Ahlquist | 294/1.1 |
| 2,800,999 | 7/1957 | Frankenstein | 206/804 |
| 2,973,218 | 2/1961 | Schaum | D7/103 |
| 3,292,528 | 12/1966 | Myler | D7/359 |
| 3,292,831 | 12/1966 | Moen | D7/103 |
| 3,338,486 | 8/1967 | Gaylor | D7/103 |
| 3,613,552 | 10/1971 | Kean | D7/103 |
| 4,106,486 | 8/1978 | Lee | 220/409 |
| 4,137,333 | 1/1979 | Daswick | 229/3.5 MF |
| 4,200,040 | 4/1980 | MacRae | 294/1.1 |
| 4,205,870 | 6/1980 | Conner | 294/7 |
| 4,334,463 | 6/1982 | Goldie | D7/359 |

FOREIGN PATENT DOCUMENTS

| 455162 | 10/1936 | United Kingdom | 294/32 |
|---|---|---|---|
| 954117 | 4/1964 | United Kingdom | 294/7 |

*Primary Examiner*—Steven Weinstein
*Attorney, Agent, or Firm*—Duckworth, Allen & Dyer

[57] ABSTRACT

A pan insert for removing and draining food from within a cooking receptacle. The insert has a flat tray which holds a roast or the like with the tray dimensioned to fit within the cooking receptacle. The tray has three side panels which hold the food on the tray when tilting and removing the tray with a free side for sliding the roast or the like off of the tray.

2 Claims, 7 Drawing Figures

PAN INSERT

BACKGROUND OF THE INVENTION

This invention relates to a food lifting device and, more particularly, to a device for removing food from within a cooking receptacle.

After cooking meat, such as a roast or fowl, in a roasting pan it is often difficult to remove the meat from the pan. Typically, the meat is removed from the pan by skewering it with a fork or the like and then lifting it out of the pan. Frequently, due to its tenderness, the meat tears or separates from the fork thereby increasing the difficulty of removing the meat as well as decreasing its aesthetic appearance. Additionally, removal of the meat from the pan often creates a mess since grease and other drippings drip from the meat as its is removed.

Prior patents pertaining to the removal of food from cooking utensils include: U.S. Pat. No. 1,497,033 to Sinclair; U.S. Pat. No. 1,739,033 to Jakubowski; U.S. Pat. No. 1,936,551 to Garrison; U.S. Pat. No. 2,875,683 to Burns; U.S. Pat. No. 3,979,145 to Clemente et al; and U.S. Pat. No. 4,113,225 to Corse.

It is an object of the present invention to provide an improved device for removing food from within a cooking utensil.

It is another object of the present invention to provide a food holding pan insert in which the food can be removed from the pan without removing the drippings.

It is still a further object of the present invention to provide a pan insert from which the food can easily be removed.

SUMMARY OF THE INVENTION

The present invention teaches an apparatus for aiding the insertion and removal of food from a cooking receptacle. The apparatus comprises a substantially horizontal holding tray which is dimensioned for insertion in a cooking receptacle such as a roasting pan. The apparatus includes means for retaining the food on the tray while lifting it from the pan.

In a preferred embodiment the tray is substantially in the form of a rectangle with three panels protruding upward along three of the four edges of the tray. Preferably, the panels are on two sides and an end of the tray. Additionally, outwardly extending flanges are provided along the top edge of each of the three panels. The flanges act as handles to aid a user in lifting the tray out of the cooking receptacle. Thus, a roast or other food can be placed onto the tray, the tray inserted into a cooking receptacle and the roast or food cooked just as if the tray were not in the cooking receptacle. The tray may be lifted slightly and tilted toward the panel on the end of the tray to drain the food of any drippings. The food will not slide off the tray but will be constrained by the end panel. Once the liquid has been drained from the foods the tray can be removed from the cooking receptacle. The food may then be removed from the tray by tilting the tray towards its edge not occupied by one of the panels. Since the food is not constrained by any of the panels it will slide off the tray. Thus, the effort in removing food from a cooking receptacle can be greatly reduced with the present invention.

BRIEF DESCRIPTION OF THE DRAWINGS

The foregoing and other objects, features and advantages will become more apparent by reference to the following detailed description, taken in conjunction with the accompanying drawings in which.

DESCRIPTION OF THE PREFERRED EMBODIMENT

Figure 1:
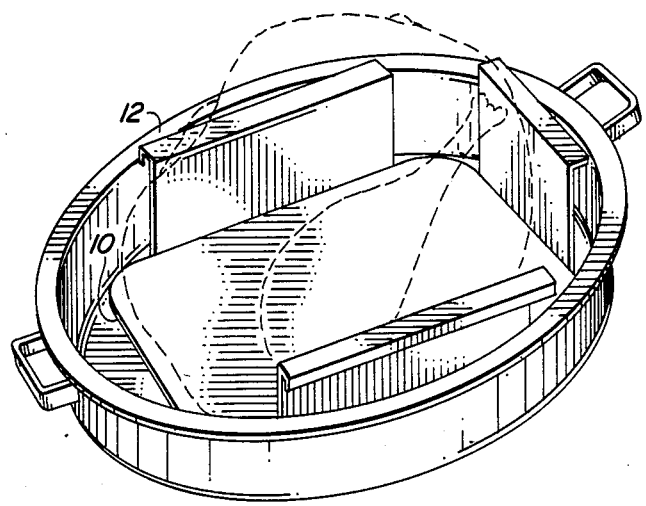
FIG. 1 is a perspective view of a pan insert in accordance with the present invention holding a turkey within a roasting pan.
Figure 2:
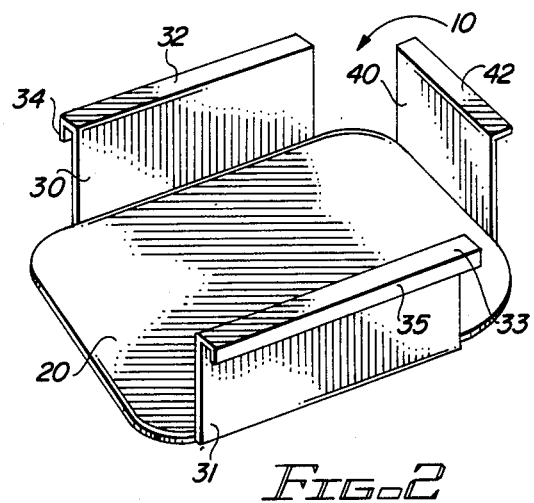
FIG. 2 is a perspective view of an insert in accordance with the present invention.
Figure 3:
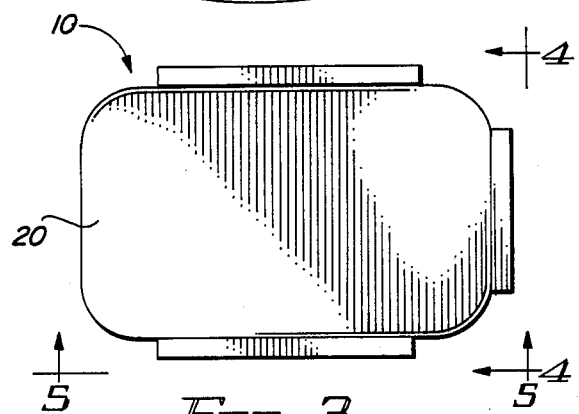
FIG. 3 is a top view of an insert in accordance with the present invention.

Reference is first made to FIG. 1 which illustrates a pan insert 10 in accordance with a preferred embodiment of the present invention inserted within a roasting pan 12. Food, such as a turkey, can be placed onto the pan insert 10 within the roasting pan 12 and cooked as if the insert 10 was not present. Once the food is cooked, the insert 10, as well as the food, may be removed from within the roasting pan 12. Once removed, the food may be slid from the insert 10 onto a serving platter or the like as desired. Referring to FIGS. 2 and 3 the insert 10 has a relatively flat holding tray 20, dimensioned to fit within a roasting pan or the like. The tray 20 illustrated in FIG. 2 is substantially rectangular but other shapes are also suitable. The insert 10 has two longitudinal side panels 30,31 protruding upward from the longitudinal edges of the tray 20 which retain the food and also serve as handles. The insert 10 also has a transverse end panel 40 protruding upward along one of the two transverse edges of the tray 20.

Figure 4:
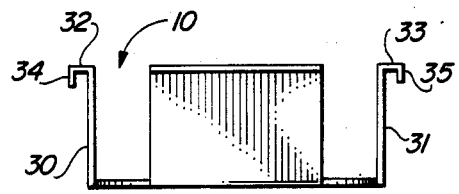
FIG. 4 is a side view 4—4 of the insert in FIG. 2.

FIGS. 2 and 4 show flanges protruding from the longitudinal side panels 30,31. Two outwardly extending longitudinal flanges 32,33 each protrude from the top edge of a corresponding one of the two longitudinal side panels 30,31. The flanges 32,33 serve as a gripping surface for lifting tray 10. Additionally, two downwardly extending longitudinal flanges 34,35 each protrude from the outer edge of a corresponding one of the two outwardly extending longitudinal flanges 32,33 and help in strengthening flanges 32,33 and providing additional gripping support.

Figure 5:
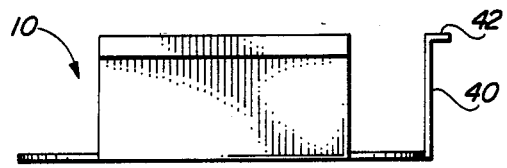
FIG. 5 is a side view 5—5 of the insert in FIG. 2.

FIGS. 2 and 5 illustrate an outwardly extending flange 42 along the top edge of the transverse end panel 40. If inserted in a rectangular roasting pan, the flanges could be dimensioned to fit over the top edge of the pan. Thus, the insert 10 could be removably attached but fixedly positioned with respect to the pan. All of the flanges are used as handles to aid the insertion and removal of the insert 10.

After the food has been cooked, the insert 10 may be tilted toward the transverse end panel 40 without the removal from pan 12 so that fat and other drippings can drain from the food. The transverse end panel 40 as well as the longitudinal side panels 30,31 prevent the food from sliding off the tray 20 while the food is being drained.

Figure 6:
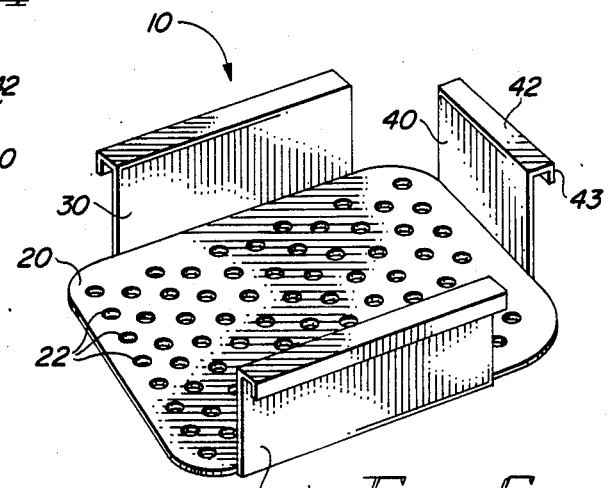
FIG. 6 is a perspective view of another embodiment of an insert having drain holes.

FIG. 6 illustrates a modified embodiment of the present invention in which a plurality of drain holes 22 are provided through the holding tray 20. Here, the meat can be drained by merely lifting the insert 10. Once the food has been drained, the insert 10 may be removed from the cooking receptacle. Tilting the insert 10 toward its edge not occupied by one of the panels 30,31, or 40 causes the food to slide from the tray 20.

Figure 7:
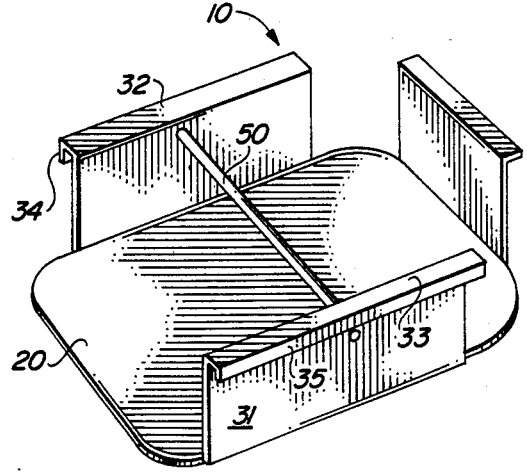
FIG. 7 is a perspective view of another embodiment of an insert with a skewer.

Reference is now made to FIG. 7 which illustrates another embodiment of the present invention. In this embodiment, the insert has a flat tray 20, two longitudinal side panels 30,31 protruding upward from the longitudinal edges of the holding tray 20 with outwardly extending flanges 32,33 along the top edge of each longitudinal side panel 30,31, and downwardly extending flanges 34,35 protruding from the outer edge of each outwardly extending flange 32,33. The insert 10 of this embodiment does not have a transverse side panel to prevent the sliding of the food but instead is provided with a skewer 50 which transverses the side panels 30,31 and is removably attached thereto in a manner well known in the art. A roast or other food is placed on the tray 20 and pierced by the skewer which is then connected to the side panels 30,31. Thus, the food is constrained from sliding on the tray 20 by the skewer 50 and can be removed from the roasting pan in a manner similar to the embodiment illustrated in FIGS. 1 through 5.

While the principals of the invention have now been made clear in an illustrative embodiment, there will become obvious to those skilled in the art many modifications in structure, arrangement, dimensions, shapes and components used in the practice of the invention and otherwise which are particularly adapted for specific purposes without departing from those principals. The appended claims are therefore intended to cover and embrace any such modifications, within the limits only of the true spirit and scope of the invention.

I claim:

1. A pan insert for use in a roasting pan for enabling removal of roast meat from the pan, said insert comprising:
   (a) a substantially planar tray dimensioned for resting on an inner bottom surface of the roasting pan and having two opposing sides and two opposing ends transverse to said sides;
   (b) first and second integral meat retaining side panels positioned on said two opposing sides of said tray and extending upwardly with respect to the bottom surface of the pan when the tray is seated on the bottom inner surface of the pan, top edges of the side panels being formed with outwardly extending portions forming handles, said first and second panels being sufficient to retain the meat and for enabling lifting of said tray, said top edges being disassociated from the pan;
   (c) a third integral meat retaining panel extending upwardly from one end of said tray and spaced from the side panels along the periphery of the pan insert to define open liquid draining spaces along said tray between said third panel and each of said first and second panels such that the tray can be lifted slightly and tilted toward said third panel to drain the meat of any drippings while the third panel will retain the meat on the pan insert; and
   (d) the other opposing end of said tray between said first and second side panels being free of panels and thus open sufficient for allowing the meat to be slid from said tray by tilting of said tray toward said other end.

2. The apparatus of claim 1 wherein said tray is perforated to allow draining of liquid from the roast meat.

* * * * *